US010176173B1

(12) United States Patent
Amacker et al.

(10) Patent No.: US 10,176,173 B1
(45) Date of Patent: Jan. 8, 2019

(54) METHOD AND APPARATUS FOR HYPERLINK LIST NAVIGATION

(75) Inventors: Matthew Warren Amacker, Santa Clara, CA (US); Jonathan A. Leblang, Menlo Park, CA (US)

(73) Assignee: A9.com, Inc., Palo Alto, CA (US)

( * ) Notice: Subject to any disclaimer, the term of this patent is extended or adjusted under 35 U.S.C. 154(b) by 750 days.

(21) Appl. No.: 13/462,532

(22) Filed: May 2, 2012

Related U.S. Application Data (63) Continuation of application No. 10/941,032, filed on Sep. 14, 2004, now Pat. No. 8,181,116.

(51) Int. Cl.
    G06F 3/00      (2006.01)
    G06F 17/30     (2006.01)

(52) U.S. Cl.
    CPC .................. G06F 17/30 (2013.01)

(58) Field of Classification Search
    CPC ................................. G06F 17/30876
    USPC ........................ 715/843, 810, 760
    See application file for complete search history.

(56) References Cited

U.S. PATENT DOCUMENTS

| | | |
|---|---|---|
| 5,890,172 A | 3/1999 | Borman et al. |
| 5,914,714 A | 6/1999 | Brown |
| 6,035,330 A | 3/2000 | Astiz et al. |
| 6,100,890 A | 8/2000 | Bates et al. |
| 6,184,886 B1 | 2/2001 | Bates et al. |
| 6,185,701 B1 | 2/2001 | Marullo et al. |
| 6,237,006 B1 | 5/2001 | Weinberg et al. |
| 6,334,145 B1 | 12/2001 | Adams et al. |
| 6,356,908 B1 | 3/2002 | Brown et al. |
| 6,460,060 B1 | 10/2002 | Maddalozzo et al. |
| 6,493,702 B1 | 12/2002 | Adar et al. |
| 6,522,939 B1 | 2/2003 | Strauch et al. |
| 6,670,968 B1 | 12/2003 | Schilit et al. |
| 6,718,365 B1 | 4/2004 | Dutta |
| 7,076,546 B1 | 7/2006 | Bates et al. |
| 7,120,641 B2 | 10/2006 | Suda et al. |
| 8,181,116 B1 | 5/2012 | Amacker et al. |
| 2002/0016786 A1 | 2/2002 | Pitkow et al. |
| 2002/0087515 A1 | 7/2002 | Swannack et al. |
| 2003/0226104 A1 * | 12/2003 | Blazejewski et al. ..... 715/501.1 |
| 2004/0162820 A1 * | 8/2004 | James et al. ..................... 707/3 |

\* cited by examiner

*Primary Examiner* — Andrey Belousov
(74) *Attorney, Agent, or Firm* — Hogan Lovells US LLP (57) ABSTRACT

The present invention provides a method and/or system for extracting or scraping links, which may be in the form of uniform resource locators (URLs), from an information source such as a Web page displayed on a Web browser, based on a rule set or a template, or based on a selection of links, and adding the extracted or scraped links to another interface in order to facilitate navigating the extracted links. The extracted or scraped links are selectable by a user of the interface to cause the Web browser to display information corresponding to the selected links listed in the interface. Controls associated with the interface may allow the user to move forward and backward through the links listed in the interface.

15 Claims, 9 Drawing Sheets

METHOD AND APPARATUS FOR HYPERLINK LIST NAVIGATION

CROSS REFERENCE TO RELATED APPLICATION

This application is a continuation of, and claims priority to, allowed U.S. patent application Ser. No. 10/941,032, filed Sep. 14, 2004, entitled "Method and Apparatus for Hyperlink List Navigation," which is hereby incorporated herein by reference for all purposes.

FIELD OF THE INVENTION

The present invention generally relates to the display of information on computer systems, and more specifically, the display of hyperlinks in a manner that facilitates the viewing of information linked by the hyperlinks.

BACKGROUND OF THE INVENTION

The development of computerized distributed information resources, such as the Internet, allows users to link with servers and networks, and thus retrieve vast amounts of electronic information. This electronic information is increasingly displacing more conventional methods of information transmission, such as newspapers, magazines, and television.

Internet services are typically accessed by specifying a unique address, such as a uniform resource locator (URL). A URL has two basic components, the protocol to be used and the object pathname. For example, the URL "http://www.irs.gov" (home page for the Internal Revenue Service), specifies a hypertext transfer protocol ("http") and a name of the server ("www.irs.gov").

The Internet has rapidly become a valuable source of information to all segments of society. Commercial enterprises utilize the Internet as an integral part of their marketing efforts to promote products or services. Likewise, many federal, state, and local government agencies also employ the Internet for informational purposes. The information provided is often updated regularly to help keep the users up-to-date with changes that may occur.

The World Wide Web (Web) is a graphic, interactive interface for the Internet. Web sites are typically comprised of a collection of Web pages that include graphic displays usually linked together and available for downloading to a client data processing system utilizing a Web browser. Each Web page has a unique address or URL within the Web that is accessible by utilizing TCP/IP transactions.

Retrieval of information on the Web is generally accomplished with a Web browser, which is an application program capable of submitting a request for information identified by a URL. The information may be provided to the client using hypertext markup language ("HTML"), which can be interpreted and understood by the Web browser.

Even though the Internet contains a vast amount of information that may be useful to many segments of society, users desiring specific information often find it difficult to find such information. Search engines are available to help users search the vast network of the Internet. Typically, search engines accept a search query from the user and look for the search query's keywords in an indexed list of terms. An indexed list is typically generated by parsing text found on Web sites and/or Web pages. Based on the search of the indexes, the URLs of the associated Web sites and/or Web pages are collected and disseminated to the user via the user's Web browser.

There are many conventional methods used to disseminate search results. One method is to display the search results in random order. Alternatively, the contents of the search results can be contrasted heuristically and statistically to determine the degree the search results match the input keywords, and then display the most relevant search results on a Web browser for viewing by the user. Nonetheless, the search results are generally displayed in a list-type format on a Web page in a Web browser.

Depending on the keywords entered by the user, the search results returned by a search engine may be numerous and may span more than one Web page. Navigating to the various Web pages identified by the search results generally requires the retrieval and display of new Web pages within the viewing area of the Web browser. If the user of the Web browser desires to go back to the list of search results, a number of key strokes and/or mouse button "clicks" are required. This is a time consuming process that generally slows the viewing of multiple links associated with the search results. Embodiments of the present invention provide a more efficient and easier managed process for navigating a list containing multiple links to information sources, such as Web pages.

SUMMARY OF THE INVENTION

At least one exemplary embodiment of the present invention provides a method and/or system for extracting links, such as uniform resource locators (URLs), from an information source, such as a Web page displayed on a Web browser, based on a rule set or a template and adding the extracted links to an interface that facilitates navigating through the links. In particular, the interface that includes the extracted links allows a user thereof to cause the Web browser to display the content linked by the various links listed in the interface. Controls associated with the interface allow the user to move forward and backward through the links listed in the interface. Moreover, the listed links may be accessed in any order desired by the user by directly selecting one of the listed links.

In another exemplary embodiment of the present invention, links may be collectively extracted from an information source, such as a Web page, and added to the interface based on links that are highlighted and/or selected on a Web page displayed on the Web browser.

In one aspect, an embodiment of the present invention provides a method that includes extracting a plurality of links displayed on a first interface, and adding at least one of the extracted links to a second interface, the at least one link being useable in the second interface for controlling that which is displayed on the first interface.

In another aspect, an embodiment of the present invention provides a method that includes extracting a plurality of links contained in an information source, organizing the links into a list of links, and providing an interface that displays the list of links and allows the user to navigate the list of links to control information displayed to the user in a different interface. Preferably, the links in the interface displaying the list of links continuously remain selectable by the user while the user is viewing information corresponding to selected links in the different interface. In one embodiment, the different interface is a Web browser having a display space for displaying information, e.g., a Web page, and the interface displaying the list of links is a GUI separate from the display space of the Web browser. The interface displaying the list of links may further be configured with "previous" and "next" controls that allow the user to sequentially navigate forward and backward in the list of links and view corresponding information in the display space of the Web browser without having to individually select links in the list.

BRIEF DESCRIPTION OF THE DRAWINGS

The foregoing aspects and many of the attendant advantages of the exemplary embodiments of the present invention will become more readily appreciated as the same become better understood by reference to the following detailed description, when taken in conjunction with the accompanying drawings, wherein.

DETAILED DESCRIPTION OF EXEMPLARY EMBODIMENTS

Exemplary embodiments of the present invention are described herein in relation to a method, system, and application program, which provide a user of a Web browser an advantageous implementation for viewing and navigating a list of links in a computer system. The exemplary embodiments described herein are preferably implemented using a computer-related system that is connected to a network of other computers and/or server devices. The exemplary embodiments may, however, be implemented using other types of computer systems not described in detail herein. Therefore, the description of the exemplary embodiments in conjunction with the figures provided herewith should not be construed as limiting the scope of the present invention.

Introduction

Figure 8:
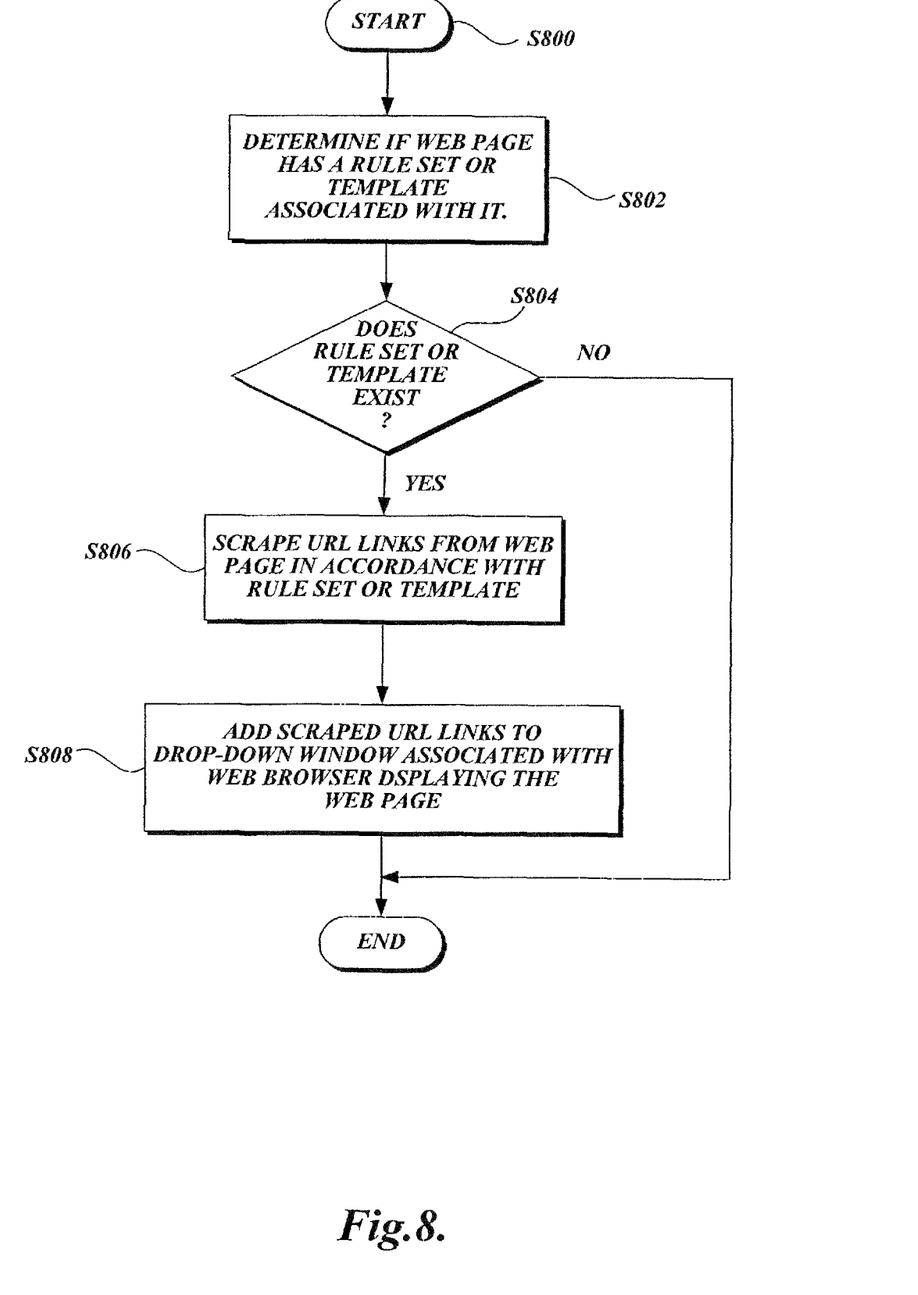
FIG. 8 illustrates a method for scraping links on a Web page based on a rule set or template in accordance with an exemplary embodiment of the present invention.
Figure 9:
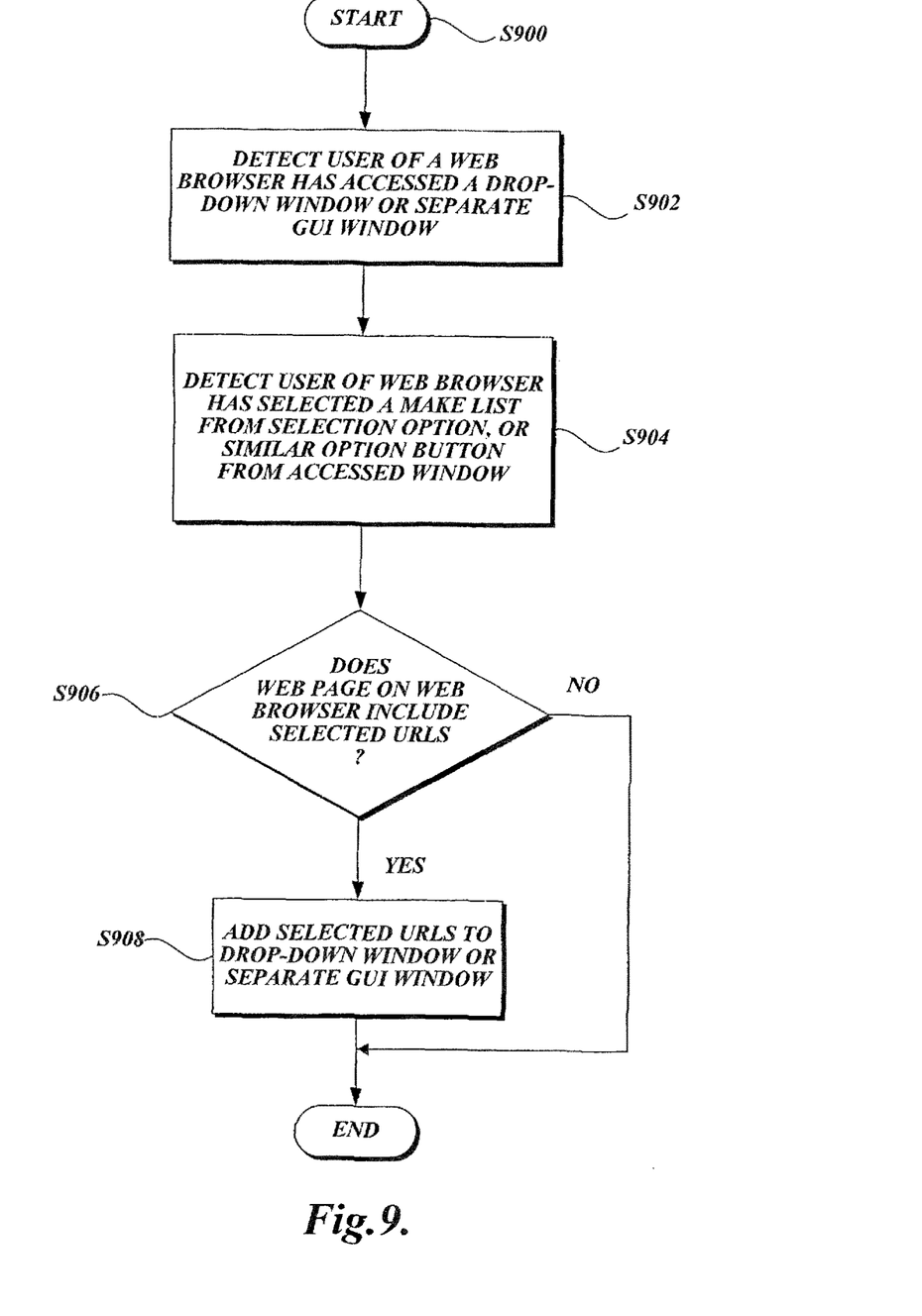
FIG. 9 illustrates a method for scraping or extracting links a Web page based on a highlighted selection on the Web page in accordance with an exemplary embodiment of the present invention.

The following description first provides a background description of basic Internet searching technology. This description is aided by referencing FIGS. 1-3. Next, various Web browser screens will be described relative to exemplary embodiments of the invention. This description will reference FIGS. 4-7. Finally, methods according to exemplary embodiments of the present invention will be described. FIGS. 8 and 9 will be referenced in the description of the exemplary methods.

Internet Searching

Figure 1:
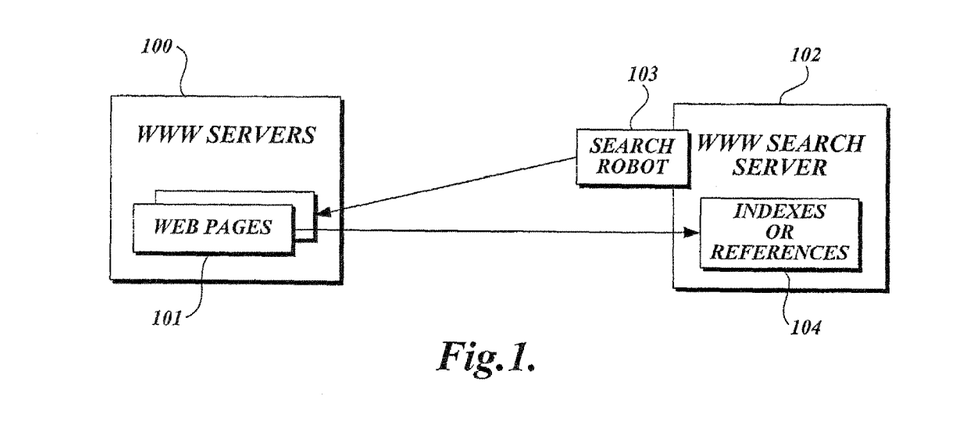
FIG. 1 illustrates an Internet searching arrangement that may be used in conjunction with exemplary embodiments of the present invention.

FIG. 1 illustrates an Internet searching arrangement that may be used in conjunction with exemplary embodiments of the present invention. At least one World Wide Web ("WWW") server 102 includes at least one search robot 103 that periodically circulates among various interconnected WWW servers 100 in order to visit various Web pages 101 that are geographically located around the globe. The WWW search server 102 analyzes the contents of the Web pages 101 and builds indexes or references 104 that are stored on the WWW search server 102. These indexes or references 104 store relevant information about the Web pages 101 that are located on the various WWW servers 100. The indexes or references 104 include a summary of the uniform resource locators (URLs) for the Web pages 101 on the WWW servers 100.

Figure 2:
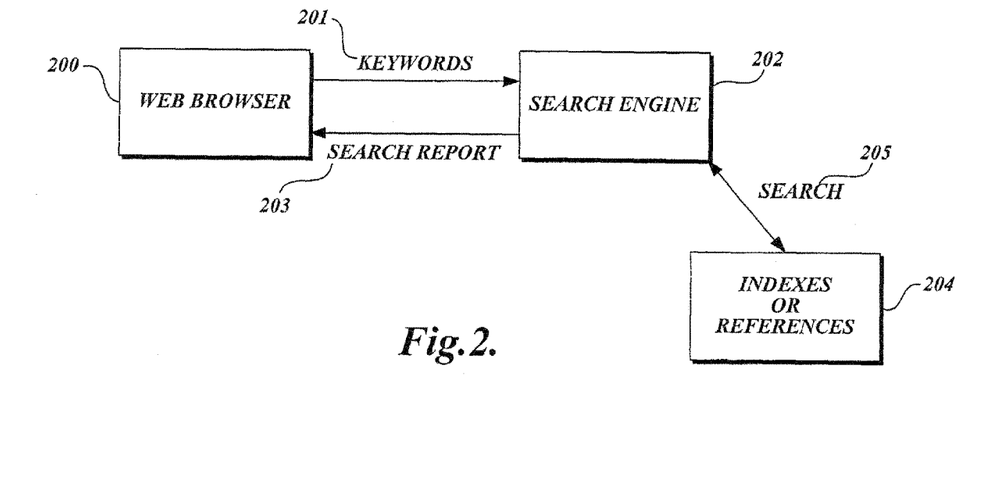
FIG. 2 illustrates a Web browser according to an exemplary embodiment in communication with a search engine for searching the Internet.

FIG. 2 illustrates a Web browser 200 according to an exemplary embodiment of the present in communication with a search engine 202 for searching the Internet. When using WWW search engines, or WWW search servers, a user conducting a Web search may contact one or more WWW search servers by way of the Web browser 200. Using the Web browser 200, keywords 201 may be communicated to the search engine 202. These keywords 201 represent the type of information desired by a user of the Web browser 200. Using these keywords 201, the search engine 202 searches previously generated indexes or references 204 for information related to the entered keywords 201. Based on a search 205 of the indexes or references 204 by the search engine 202, a search report 203 is returned to the Web browser 200 for viewing by the user. Further details of the Web browser 200 with the functionality provided according to exemplary embodiments of the present invention will be described in further detail below.

The exemplary embodiments of the present invention are operable in conjunction with other searching technologies. For example, the exemplary embodiments of the present invention may be used to scrape or extract search results obtained from general or specialized databases. Legal, medical, and manufacturing databases are a few examples of such specialized searchable databases.

Exemplary Computer System

Figure 3:
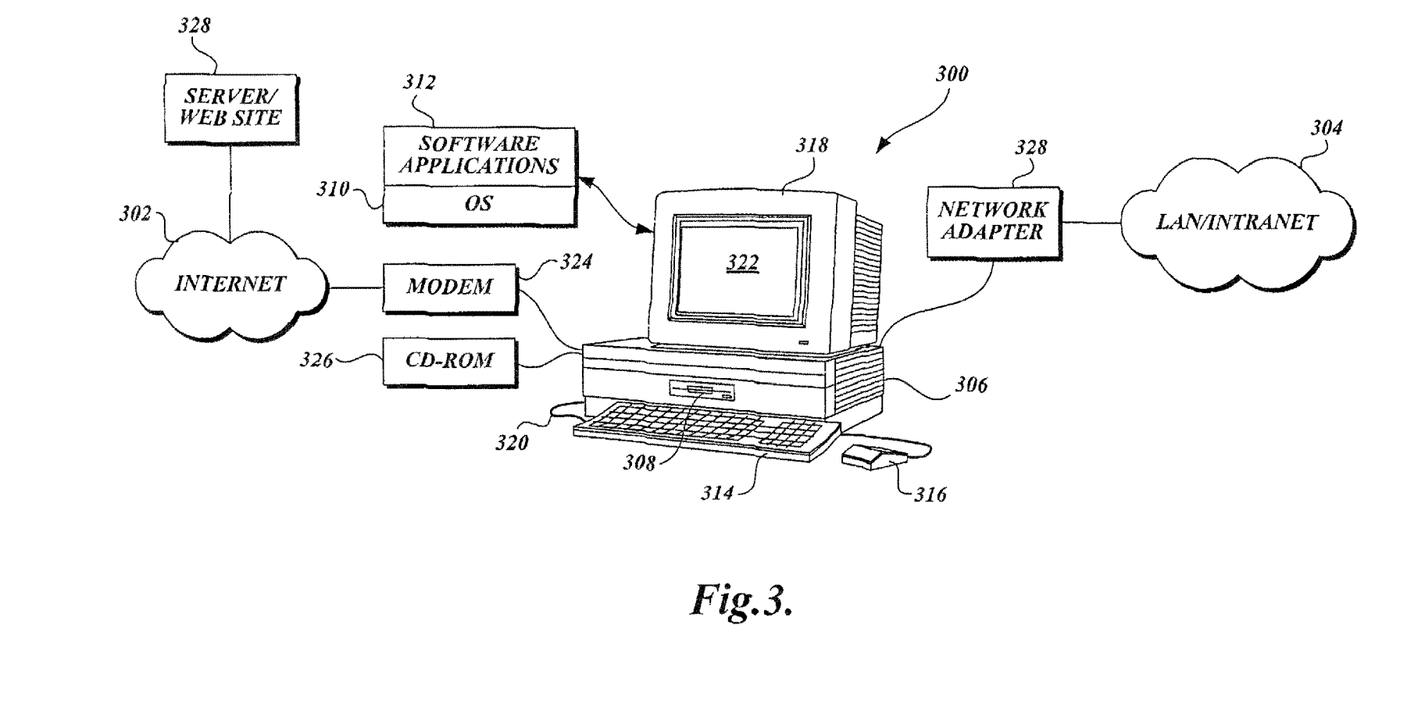
FIG. 3 illustrates an exemplary networked computer system that may be used in conjunction with exemplary embodiments of the present invention.

FIG. 3 illustrates an exemplary networked computer system 300 that may be used in conjunction with exemplary embodiments of the present invention. The computer system 300 is connected to the Internet 302 and may also be connected to an intranet network 304. The computer system 300 illustrated in FIG. 3 is an example of a computer system with which the exemplary embodiments of the present invention may be practiced.

The computer system 300 includes a central processing unit (CPU) housed in a casing 306 (collectively referred to as a processor). The processor 306 may hold various hardware components, such as a disk drive 308 and various memory devices (not shown). Stored within the memory devices are the operating system (OS) 310 and software applications 312. The software applications 312 include a Web browser application utilized and implemented in a manner which allows for the operation of the exemplary embodiments of the present invention. The OS 310 typically includes software for controlling the allocation and usage of hardware resources such as memory, CPU time, disk space and peripheral devices. The OS 310 therefore operates as a foundation upon which applications, such as the Web browser 200, are built.

Several peripheral input/output (I/O) devices are connected to the processor 306. These I/O devices include a keyboard 314, a mouse 316, and a display monitor 318. The keyboard 314 is coupled to the processor 306 by way of a cable 320. The display monitor 318 includes a display screen 322, which may be implemented using a cathode ray tube (CRT), a liquid crystal display (LCD), or an electrode luminescent panel or the like. The display monitor 318 is utilized to provide a graphical user interface (GUI) that allows user interaction with the software applications 312 and the OS 310. If desired, the mouse 316 may be implemented using a trackball, a joystick, touch sensitive tablet or screen, track pad, or the like. The mouse 316 may be used to move a pointer or cursor on the display screen 322.

The processor 306 may also be coupled to one or more peripheral devices such as a modem 324, a CD-ROM 326, and a network adapter 328. Each of the peripheral devices may be internal or external to the processor 306. Various other output devices, such as a printer (not shown), may also be coupled to the processor 306.

The computer system 300 is illustrated as being in communication with a local area network (LAN) or intranet 304. The computer system 300 is also illustrated as being in communication with the Internet 302, which permits access to WWW servers and/or Web sites 328. The connection to the WWW servers and/or Web sites 328 allows the computer system 300 to download Web pages while a Web browser is being used in conjunction with the computer system 300.

The computer system 300 is designed to provide a GUI by way of the OS 310 and the software applications 312. The OS 310 in conjunction with the software applications 312 may reside on computer readable medium to direct the operation of the computer system 300. Any suitable computer readable medium may retain the OS 310 and the software application 312, such as RAM, ROM, FLASH memory, and/or other disk and/or tape drive (e.g., magnetic diskette, magnetic tape, CD-ROM, optical disk, or other suitable storage media). The computer readable medium may be non-volatile or volatile type storage. Also, any suitable OS may be used to direct the processing and general operation of the computer system 300.

Those skilled in the art will appreciate that the computer system 300 may be connected to the Internet 302 via proxies, or alternatively a LAN server (not shown). This and other exemplary functional environments may be used to implement embodiments of the present invention. Furthermore, exemplary embodiments of the present invention may be executed and used with and/or in a variety of systems, including a variety of computers having a number of different operating systems. These computers may be, for example, a personal computer, a network computer, a tablet computer, a handheld computer, a laptop computer, a server, a midrange computer, or a mainframe computer. In addition, the computer may be a stand-alone system or part of a network such as a LAN or a wide-area network (WAN). For the purposes of illustration, the exemplary embodiments of the present invention are described with reference to a computer system that is operationally connected to the Internet.

Exemplary Web Browser Screen Shots According to Exemplary Embodiments

Figure 4:
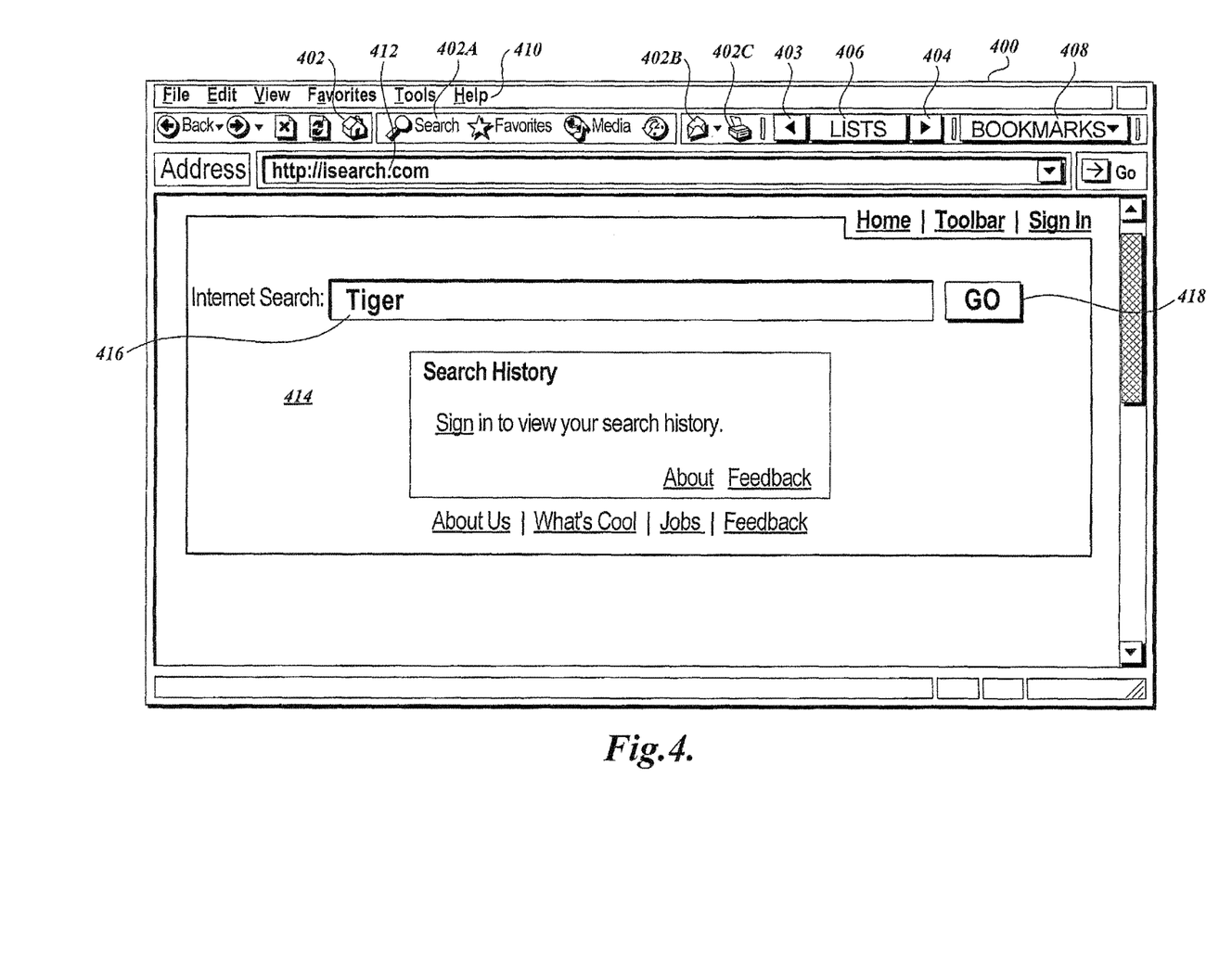
FIG. 4 illustrates a Web browser view that includes a Web page associated with a search engine.

FIG. 4 illustrates a Web browser 400 displaying a Web page 414 associated with a search engine. The Web browser 400 is a GUI that is displayable on the display monitor 318 of the computer system 300. The Web browser 400 includes a number of selection buttons 402, such as a search button 402A, a mail button 402B, and print button 402C. The operation of the buttons 402A, 402B, and 402C is understood by those having ordinary skill in the art. Therefore, the operational characteristics of the buttons 402A, 402B and 402C will not be described in detail herein.

The Web browser 400 also includes a number of menu selection items 410 along with a URL address field 412. The URL displayed in the URL address field 412 normally represents the address of the Web page 414 that is displayed within the display space of the Web browser 400. The Web page 414 includes a search field 416. In the example illustrated in FIG. 4, the search field 416 includes user entered text "tiger." In order to search for topics related to the user entered text, a user may click or otherwise actuate a GO button 418.

According to exemplary embodiments of the present invention, the Web browser 400 also includes a previous arrow 403 and a next arrow 404. A navigation list button 406 is also included as part of the Web browser 400. The specific operational characteristics of the arrows 403 and 404, and the navigation list button 406, will be described in detail in the following description. In addition, the Web browser 400 also includes a bookmarks section button 408.

Figure 5:
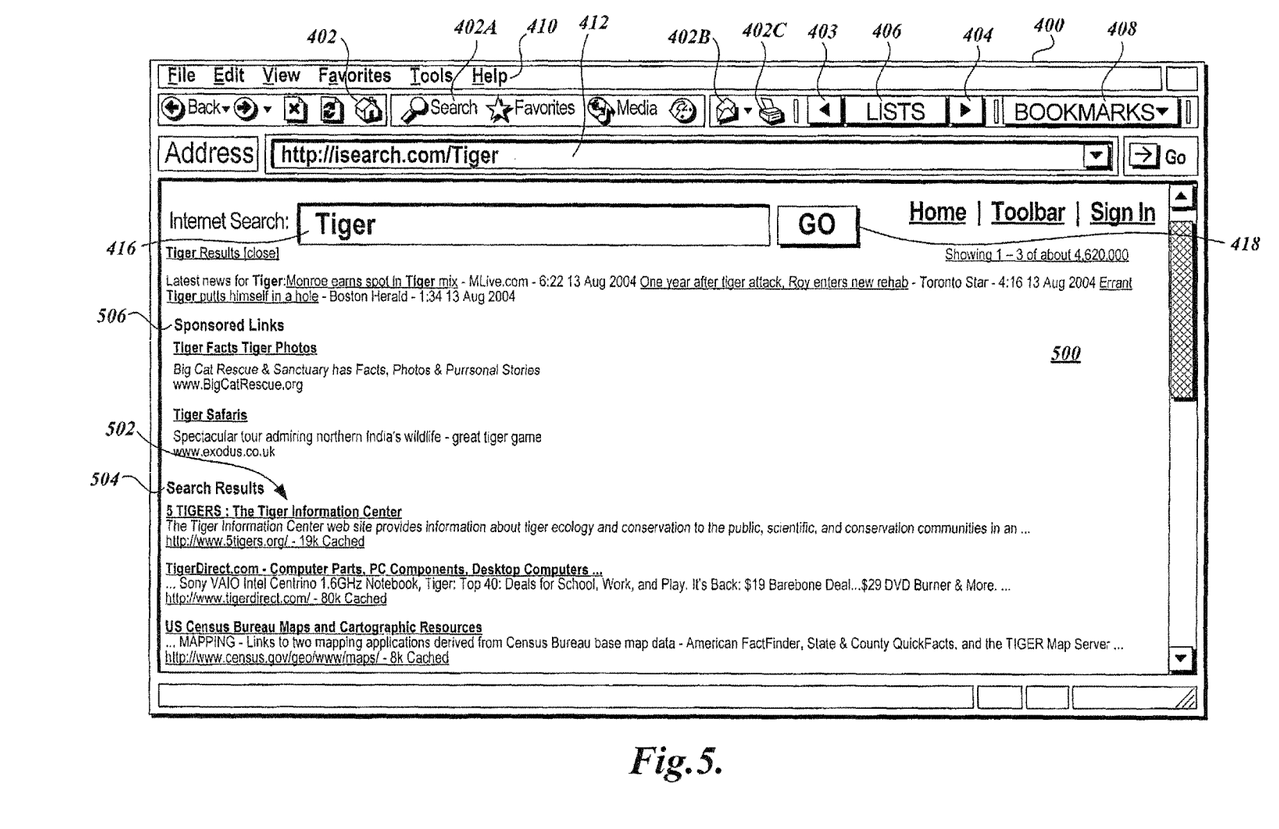
FIG. 5 illustrates the Web browser of FIG. 4 that includes a Web page, after a keyword and/or search term was entered into a search field and a search button was actuated by a user of the Web browser.

FIG. 5 illustrates the Web browser 400 displaying a Web page 500 after the search term "tiger" was entered into the search field 416 and the GO button 418 was actuated. As is illustrated in FIG. 5, the Web page 500 is displayed within the display space of the Web browser 400. The Web page 500 includes a number of search results 502 that are displayed within a Search Results section 504 of the Web page 500. The Web page 500 further includes a Sponsored Links section 506.

Figure 6:
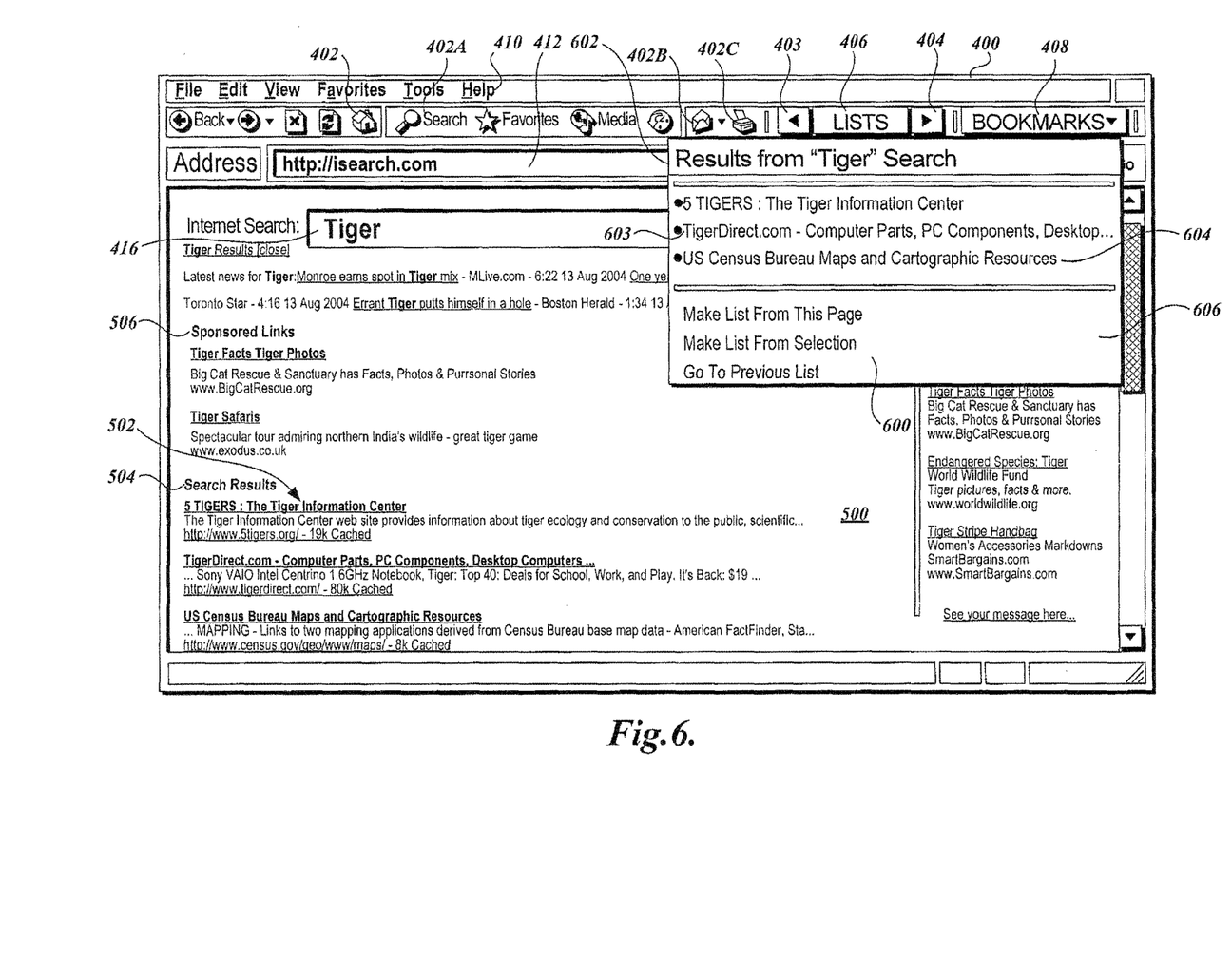
FIG. 6 illustrates the Web browser and Web page of FIG. 5 that include a navigation search list window that is selectable using a navigation search list button of the Web browser in accordance with exemplary embodiments of the present invention.

Actuation of the navigation list button 406 causes a navigation list window 600 to be displayed with the Web browser 400, as shown in FIG. 6. The navigation list window 600 may be a drop-down window that is connected to the Web browser 400, or alternatively, the window 600 may be a GUI window that is separate from the Web browser 400.

As illustrated in FIG. 6, the navigation list window 600 includes a results title section 602, a window section 604 with a list of links, and an options section 606 (options described later). In this example, the window section 604 includes links from the search results displayed on the Web page 500. In particular, each of the search results 502 listed in the Search Results section 504 is contained within the window section 604.

Using the navigation list window 600, a user of the Web browser 400 may quickly navigate through the various search results associated with the keyword "tiger." In particular, a user of the Web browser 400 may select the various search result links listed within the window section 604 in order to quickly navigate to Web pages associated with the search results. As search results listed in the window section 604 are chosen by a user of the Web browser 400, a Web page associated with the chosen search result will be displayed within the display space of the Web browser 400. However, such a selection will not replace the search results links displayed within the window section 604. This eliminates the need of having to reload or backtrack to the original search results Web page 500 after a search result link is selected, as is currently required with conventional Web browsers in operation today.

As is further illustrated in FIG. 6, the previous arrow 403 and the next arrow 404 are also included in close proximity to the navigation list button 406. The previous arrow 403 and the next arrow 404 allow a user of the browser 400 to easily navigate forward and backward to various links listed within the window section 604. A user of the browser 400 is not required to select the navigation list button 406 before using the previous arrow 403 and/or the next arrow 404. In particular, the previous arrow 403 and the next arrow 404 may be used independent of the navigation list button 406.

FIG. 6 illustrates three links listed within the window section 604; however, this is by way of example only. The number of links listed may be based on the number of links found after a given search. For example, all of the links found as a result of a search may be scraped or otherwise extracted from search results Web pages and listed within the window section 604, even if the links are not included on the Web page 500 displayed by the Web browser 400.

As noted earlier, a Web search may return numerous search results that can span several Web pages reporting the search results. An embodiment of the present invention is configurable to access some or all of the search results Web pages and scrape the links at once, without having to first display each of the search result Web pages to the user. Alternatively, an embodiment of the invention may be configured to scrape the links shown only on the currently displayed Web page, which may include scraping a link to the next search results Web page, and placing the links in the navigation list window 600. When the link to the next search results Web page is selected in the navigation list window 600, the next search results Web page is displayed and a new list of links scraped from the newly-displayed page is added to the navigation list window 600. If desired, the number of links listed within the window section 604 of the navigation list window 600 may be limited to a predetermined number.

Figure 6A:
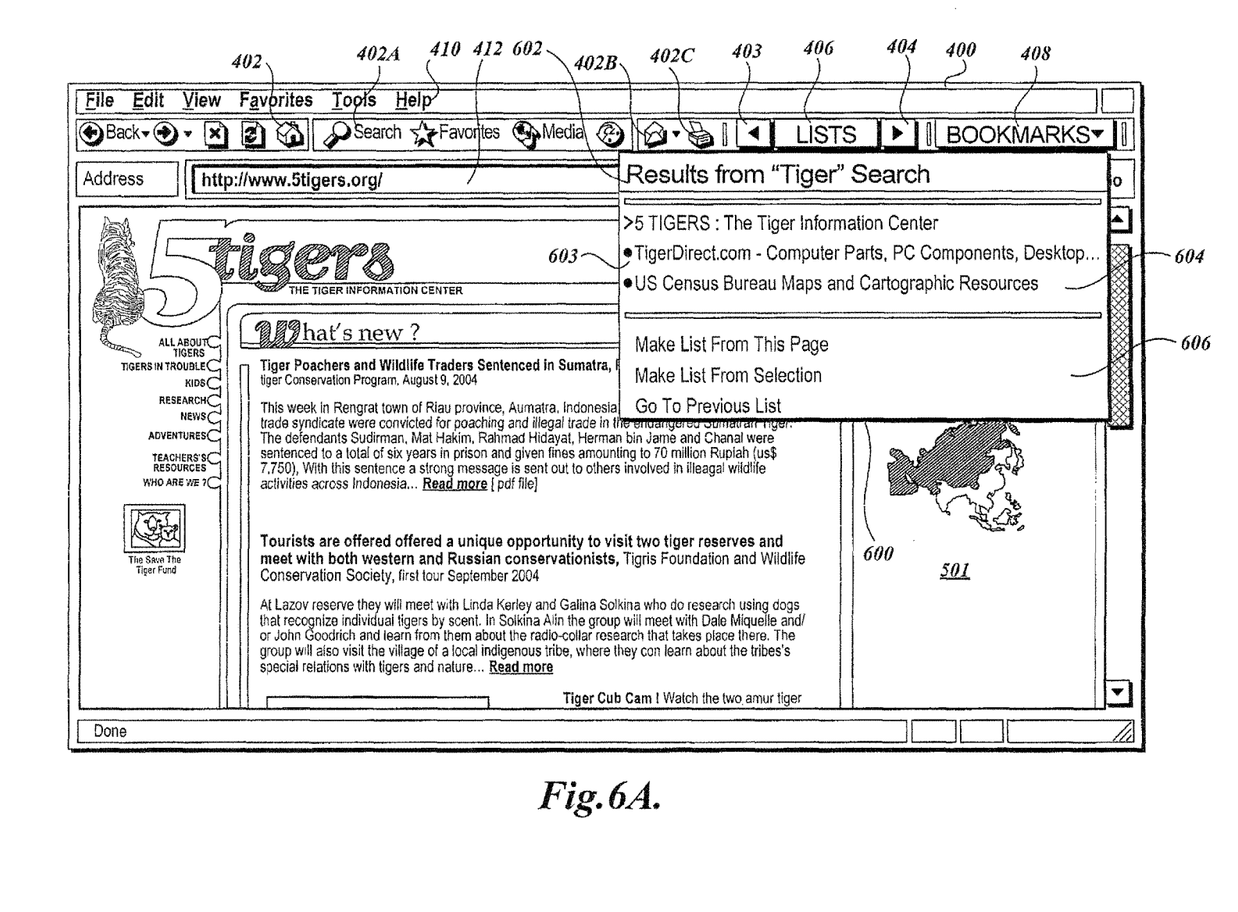
FIG. 6A illustrates the Web browser illustrated in FIG. 6 after a link in the search results window section was selected by a user of the Web browser.

Each of the search result links listed within the window section 604 may include a bullet 603 positioned adjacent thereto. A bullet 603 indicates that the corresponding link within the window section 604 has not yet been selected. FIG. 6A illustrates a Web page 501 after the "5 TIGERS: The Tiger Information Center" link in the window section 604 was selected by a user of the Web browser 400. As is illustrated, the bullet 603 changed to an arrow or sideways caret ">", which indicates the Web page actively displayed within the display space of the Web browser 400. A vertical line "|" may be shown in place of the bullet or sideways caret if a link from the window section 604 has already been viewed by a user, but another Web page has been loaded and on display within the display space of the Web browser 400. Instead of use of a bullet 603, a caret ">", and a vertical line "|", colors and/or highlighting may be used to show status information related to the links listed in the window section 604. Other characteristics, symbols or features for showing status information related to the links may also be used, depending on implementation requirements.

The bookmarks section button 408 may be used to display a list of links previously saved by the user or users of the Web browser 400. The links displayed in the bookmarks section may be collected within folders, or listed individually. As is understood by those having skill in the art, these bookmarked links may be used to quickly access Web pages visited on a regular basis. According to an exemplary embodiment of the present invention, links accessible via the bookmarks section button 408 may be added to the navigation list window 600 to allow for quick navigation of the links. This is achieved by way of a soft button or other control included within the bookmarks section. The soft button allows a user to select various links in the bookmarks section for extraction and addition to the navigation list window 600. Links extracted from the bookmarks section and added to the navigation list window 600 may be displayed in cooperation with the Web browser 400, as discussed herein.

Figure 7:
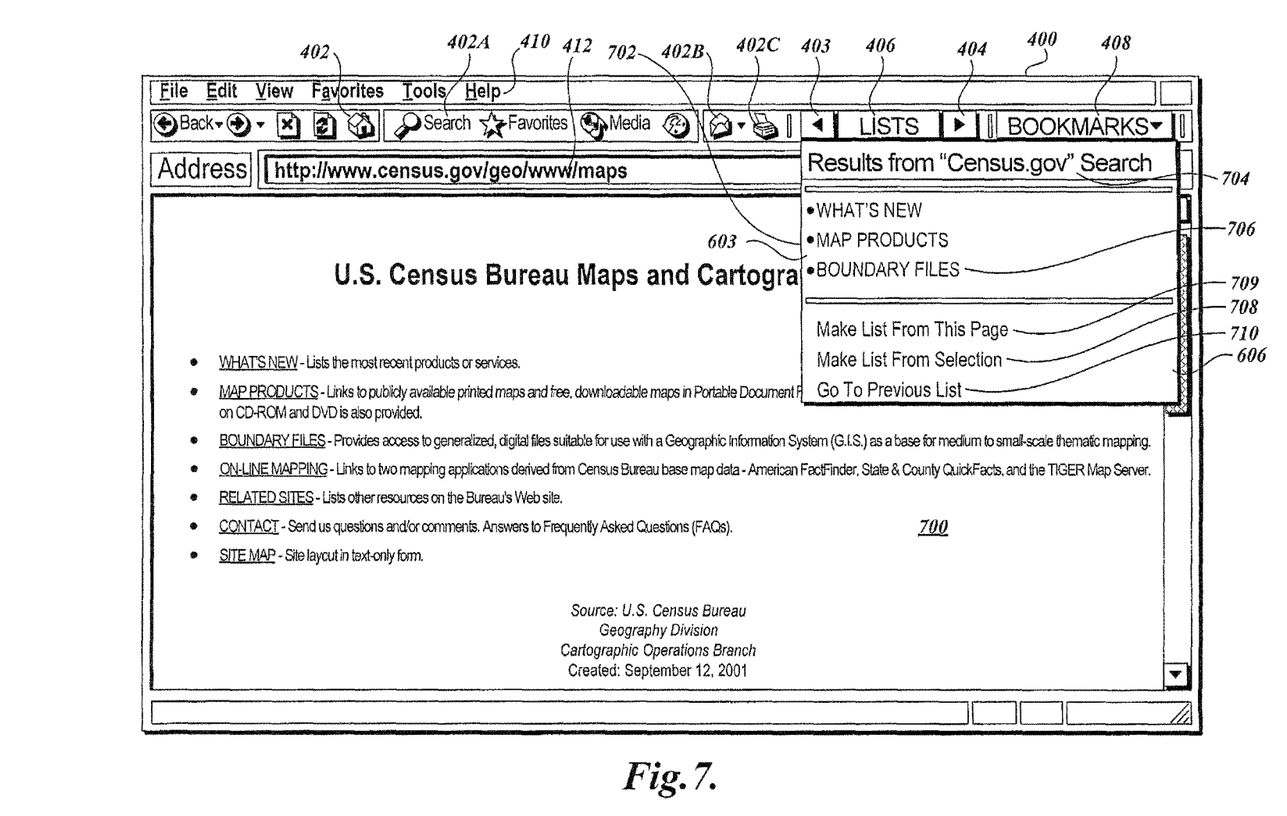
FIG. 7 illustrates a Web page that was selected for display on the Web browser in accordance with exemplary embodiments of the present invention.

FIG. 7 illustrates a Web page 700 that was selected for display on the Web browser 400. In this case, the Web page 700 is a link that was found when the keyword "tiger" was entered into the search field 416 and the GO button 418 was actuated by a user of the browser 400. FIG. 7 further illustrates a navigation list window 702 that includes a title section 704, a window section 706 with a list of links, and an options section 606. The window section 706 includes links found in the Web page 700. In particular, the first three links in the Web page 700 are listed in the window section 706.

A user of the Web browser 400 may select the links to be listed in the window section 706 by first identifying (e.g., by highlighting) various links on the Web page 700. Once a selection of links is made, e.g., by highlighting some or all of the links displayed on the Web page 700, a Make List From Selection option 708 from the options section 606 may be selected to fill the window section 706 with the highlighted links. The Make List From This Page option 709 fills the window section 706 with all of the links listed on the Web page 700. The Go To Previous List option 710 fills the window section 706 with the list of links previously listed in the window section 706. In the example given above, selecting the Go To Previous List option 710 would fill the window section 706 with the search result links seen in window section 604 (see FIG. 6).

Although the process of highlighting text on a Web page is well known, it will be briefly described. Using a mouse or other such device, such as the mouse 316, a user of the Web browser 400 may highlight text, including links, displayed in a Web page. To highlight text, the user hovers a pointer that is movable using the mouse 316 over the first letter of the text. The user then clicks or actuates a button on the mouse 316 and uses the mouse 316 to move the pointer over the text. Generally, the user continues to actuate the button on the mouse 316 as the pointer is moved over the text. At the point the last letter of the text to be highlighted is reached, the user generally releases the button on the mouse 316 to stop the highlighting process.

One method of extracting a plurality of links displayed in an interface, such as a Web browser, is commonly referred to as scraping. Scraping typically involves analyzing the programming language of Web pages and identifying content, such as links, in the Web page. Although the exemplary embodiments described herein generally refer to scraping of links, any form of link extraction may be used.

Scraping or extracting contents from a Web page, according to the exemplary embodiments of the present invention, can be accomplished in various ways. For example, templates or rule sets may be used to determine which links from a Web page should be scraped or extracted and added to a navigation list windows described above. Alternatively, scraping or extracting of links may be limited to only those links that are selected or highlighted by a user of a Web browser.

A rule set or template for scraping of Web pages is designed to read the language of a Web page (e.g. HTML, or the like) to determine which links should be scraped and added to a navigation list window. For example, search result Web pages programmed in HTML may include references or identifiers (otherwise referred to herein as markers) to distinguish certain links, such as search result links, from other links, such as sponsored (advertising) links. For example, in FIG. 5, the links listed in the Sponsored Links section 506 may have different markers in the HTML language used to design the Web page 500 than the links listed in the Search Results section 504. The rule set or template is used to extract only those links having (or not having, as the case may be) certain predetermined markers. In accordance with at least one exemplary embodiment of the present invention, the rule set or template used to scrape the Web page 500 is designed to locate only those links that are retrieved from indexes or references searched by WWW search servers. Therefore, in the case of Web page 500, those links listed in the Sponsored Links section 506 will not be scraped and added to the navigation list window 600.

An instruction set implementing a rule set or template may, for example, search the HTML language of the Web page being scraped for the identifier "href=", possibly combined some additional text markers such as "url?q=", to determine whether the link that follows is a link that should be included or excluded from a navigation list window 600. For instance, users may desire to exclude advertising (e.g., sponsored) links from being scraped and displayed in the navigation list window. In some cases, the identifier "href=" with additional text is used in the programming language of search result Web pages to identify links retrieved from indexes or references searched by WWW search servers. URLs associated with sponsored links may not include the "hre=" identifier or may have additional or alternative text markers, e.g., as noted above. Accordingly, when scraping links from a Web page to fill a navigation list window 600, a rule set or template may cause only those URLs having markers indicating links of interest (or not having markers, such as those indicating advertising links) to be selected from the HTML language of the Web page being scraped. Other ways of searching and identifying links for inclusion in a navigation list window may be implemented and are well within the purview of the exemplary embodiments of the present invention.

Exemplary Methods

Various methods according to exemplary embodiments of the present invention will now be described. The described methods may be practiced with the various arrangements described herein, and in some instances specific hardware and interfaces described herein will be referenced in conjunction with the discussed methods. However, other arrangements may also be used to practice the exemplary embodiments of the present invention.

The exemplary methods of the present invention may be embodied in various ways. For example, the exemplary methods of the present invention may be coded using a computer programming language and stored for execution on a computer readable medium. The computer readable medium may be a volatile or non-volatile medium.

FIG. 8 illustrates a method for scraping (or otherwise extracting links) from a Web page based on a rule set or template. In particular, block S800 represents the beginning of the processing of one method according to an exemplary embodiment of the present invention. A Web page displayed on a Web browser is referenced to determine if the displayed Web page has an associated rule set or template (S802). For example, depending on how the Web browser is implemented, there may be several if not many predefined rule sets or templates preprogrammed for use when scraping links from a Web page. The rule sets or templates for particular Web pages or Web sites may be defined during the authoring of the Web browser. The rule sets or templates could also be added or otherwise made available to the Web browser during regular updates thereto or by add-on routines.

If a rule set or template exists (S804) for the Web page displayed on the Web browser, the Web page is scraped according to the rule set or template (S806). Processes for scraping links from a Web page according to a rule set or template have been described above. Those links extracted or scraped from the Web page are added (S808) to a drop-down or GUI window associated with the Web browser or separate application, such as the navigation list window 600 or 702 previously described. Persons having ordinary skill in the art will recognize that the present invention may be implemented in many other general applications, and is not limited to a Web application as described in the example shown in FIG. 8.

If it is determined in block S802 that a rule set or template does not exist for the displayed Web page, the method may opt to end without scraping the Web page. Alternatively, a default rule set or template may be used or the method may simply scrape all links that are on the Web page. The method illustrated in FIG. 8 may be repeated each time a new Web page is displayed on the Web browser. Once the links are scraped from the Web page and added to a navigation list window, the user is able to quickly and easily navigate the list of links in the navigation list window with out having to direct the Web browser to return to the original Web page from which the scraped links were obtained.

FIG. 9 illustrates a method for scraping a Web page based on links highlighted on the Web page. In particular, block S900 represents the beginning of the processing of one method according to an exemplary embodiment of the present invention. A Web browser displaying the Web page detects a user of the Web browser has accessed a drop-down window via a button on the Web browser, or a separate GUI window associated with the Web browser (S902). Next the Web browser detects whether the user has selected an option from the drop-down window (or the separate GUI window) that is designed to detect if links have been highlighted and/or selected on the Web browser (S904). Such an option may be a Make List From Selection option 708 as described earlier in connection with FIG. 7.

In block S906, the Web browser determines if links are highlighted and/or selected on the Web page displayed on the Web browser. If links are highlighted and/or selected on the Web page, the highlighted and/or selected links are extracted or scraped and added to the drop-down window or separate GUI window (S908). Otherwise, block S906 terminates the exemplary method illustrated in FIG. 9.

Alternatives

As indicated above, a navigation list window may be in the form of a separate GUI window that is not functionally attached to the Web browser. In such a case, the navigation list window may directly incorporate previous and next buttons that may be used to navigate forward and backward through the links listed in the navigation list window.

Although the exemplary embodiments are described as being integrated with a Web browser, the present invention is not limited as such. The exemplary embodiments may be implemented using existing Web browsers and future Web browsers. As is appreciated by those of ordinary skill in the art, adding technology to existing Web browsers and other software is generally accomplished through an update process. Web browser updates are generally embodied in computer executable code packages that, when executed by a user or controlling computer system, modify or update the code of an existing Web browser so that a desired change and/or correction is facilitated. The methods of the exemplary embodiments of the present invention may be easily added to existing and future Web browsers, or other software used for navigating the links on computing systems. One such example of a Web browser update may implement a toolbar that operates in conjunction with or separate from the Web browser.

If desired, the functionality of the exemplary embodiments of the present invention may be implemented in a separate application that is designed to operate alongside a Web browser. The separate application could have the same operational characteristics as those discussed above in connection with the list navigation window. However, instead of being an integral part of the Web browser, either by origin or as a result of an update process, the list navigation window and associated functionality are embodied as a separate application that is executed separately from the Web browser.

Moreover, although the exemplary embodiments of the present invention have been discussed in relation to a Web browser having search results listed thereon, this is done by way of example only. The exemplary embodiments may also scrape or extract links from other sources for display and navigation via a navigation search window. The sources include, but are not limited to, word-processing documents, database documents, spreadsheet documents, email-related documents, and Portable Document Format (PDF) documents. Furthermore, embodiments of the present invention may enable a user to extract and navigate a plurality of links that point to a mixed group of resources, including (but not limited to) files accessible on a local file system, on local or wide area networks, and/or on the Internet (e.g., using URL links).

It is readily appreciated by those having skill in the art that the operational methodology discussed in conjunction with the exemplary embodiments of the present invention is by way of example only. For example, the use of a mouse or pointing device is not necessarily required when using the navigation search window or selecting Web page links for extraction. A keyboard or other computer manipulating apparatus may also be used to affect operation of the exemplary embodiments of the present invention.

Furthermore, links may reside on any computer system. For example, a computer implementing the exemplary embodiments of the present invention may extract links for display within a navigation search window directly from a memory or a locally-accessible storage. Similarly, the computer may, in addition, extract links for display within a navigation search window from devices that are permanently and/or temporarily connected (e.g., networked) thereto.

Accordingly, while several exemplary embodiments of the present invention have been illustrated and described, it will be appreciated that various changes can be made therein without departing from the spirit and scope of the present invention. The scope of the invention should be determined from the following claims and equivalents thereto.

What is claimed is:

1. A computer-implemented method, comprising:
   receiving a search query;
   providing a plurality of search results for the search query, at least a portion of the search results to be displayed in a first interface, and at least a portion of the search results each being associated with a respective navigational element, of a plurality of navigational elements, that references a respective page of content;
   extracting the plurality of navigational elements from the plurality of search results;
   analyzing the plurality of navigation elements using at least one rule set to select a first navigational element of the plurality of navigational elements displayed in the first interface concurrently with a second navigational element of the plurality of navigational elements not displayed in the first interface;
   causing the first navigational element and the second navigational element to be displayed in a second interface, wherein the second interface includes at least one of a window, a list, or a drop-down element configured to be displayed over at least a portion of the first interface;
   receiving information indicating a selection, via the second interface, of a specified navigational element of the at least one selected navigational element displayed in the second interface; and
   causing the respective page of content, referenced by the specified navigational element, to be displayed in the first interface while the at least one selected navigational element is displayed in the second interface.

2. The computer-implemented method of claim 1, further comprising:
   enabling a user to view navigational elements for different search results in the second interface.

3. The computer-implemented method of claim 1, wherein the navigational elements are further extracted according a template for extracting navigational elements.

4. The computer-implemented method of claim 1, wherein the navigational elements are further extracted according to an interaction of a user with the search results in the first interface.

5. The computer-implemented method of claim 1, wherein at least one of the navigational elements includes a uniform resource locator (URL) used to access the respective page of content.

6. The computer-implemented method of claim 1, wherein the first interface and the second interface are both accessible through a browser application.

7. The computer-implemented method of claim wherein the respective page of content is accessible over at least one network.

8. A computing device, comprising:
   at least one processor;
   a display screen; and
   memory including instructions that, when executed by the at least one processor, cause the computing device to:
      obtain at least one search term entered into an application;
      display at least a portion of a plurality of search results for the at least one search term in a first interface of the application, at least a portion of the search results each being associated with a respective navigational element, of a plurality of navigational elements, that references a respective page of content;

extracting the plurality of navigational elements from the plurality of search results;

analyzing the plurality of navigation elements using at least one rule set to select a first navigational element of the plurality of navigational elements displayed in the first interface concurrently with a second navigational element of the plurality of navigational elements not displayed the first interface;

display the selected first navigational element and the selected second navigational element in a second interface of the application, wherein the second interface includes at least one of a window, a list, or a drop-down element configured to be displayed over at least a portion of the first interface;

receive information indicating a selection of a specified navigational element of the at least one selected navigational element via the second interface; and cause the respective page of content, referenced by the specified navigational element, to be displayed in the first interface while the at least one selected navigational element is displayed in the second interface.

9. The computing device of claim 8, wherein at least one of the navigational elements includes a uniform resource locator (URL) used to access the respective page of content.

10. The computing device of claim 8, wherein the application is a Web browser application.

11. The computing device of claim 8, further comprising:
at least one network communications component configured to access the respective page of content over the at least one network.

12. A non-transitory computer-readable storage medium including instructions that, when executed by at least one processor of a computing system, cause the computing system to:

receive a search query for a user;

cause at least a portion of a plurality of search results for the search query to be displayed in a first interface, at least a portion of the search results being associated with a respective link, of a plurality of links, that references a respective page;

extract the plurality of navigational links from the plurality of search results;

analyze the plurality of navigation links using at least one rule set to select a first navigational link of the plurality of navigational links displayed in the first interface concurrently with a second navigational link of the plurality of navigational links not displayed the first interface;

cause the selected first link and the selected second link to be displayed in a second interface, wherein the second interface includes at least one of a window, a list, or a drop-down element configured to be displayed over at least a portion of the first interface;

receive information indicating a selection, via the second interface, of a specified link of the at least one selected link displayed in the second interface; and cause the respective page referenced by the specified link to be displayed in the first interface while the at least one selected link is displayed in the second interface.

13. The non-transitory computer-readable storage medium of claim 12, wherein the instructions when executed further cause the computing system to:
enable the user to view links for different search results in the second interface.

14. The non-transitory computer-readable storage medium of claim 12, wherein at least one of the links includes a uniform resource locator (URL) used to access the respective page of content, and
wherein the first interface and the second interface are both accessible through a browser application.

15. The computer-implemented method of claim 1, wherein selecting the first and second navigational elements comprises selecting all of the navigational elements associated with the search query.

* * * * *